UNITED STATES PATENT OFFICE.

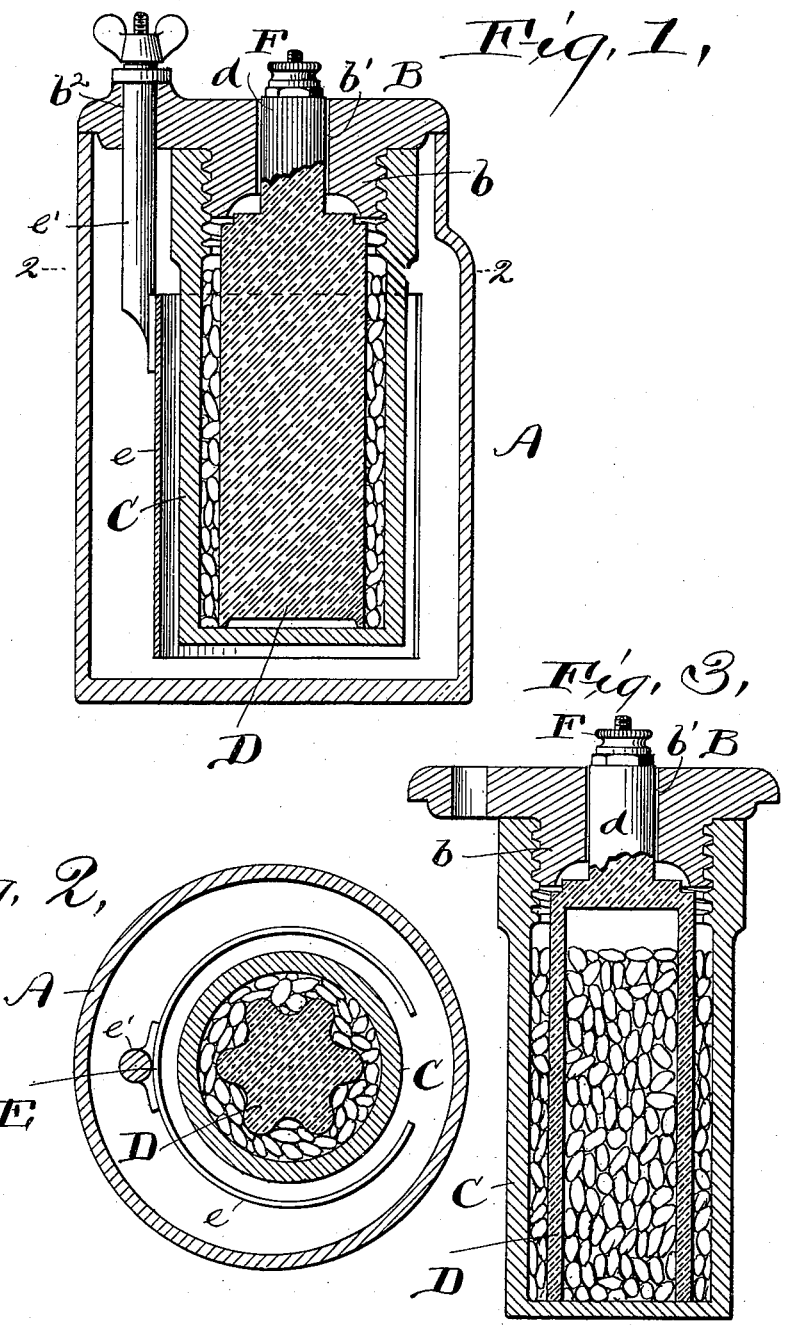

CHARLES T. RICHMOND, OF CLEVELAND, OHIO, ASSIGNOR TO THE NATIONAL CARBON COMPANY, OF SAME PLACE.

GALVANIC BATTERY.

SPECIFICATION forming part of Letters Patent No. 614,759, dated November 22, 1898.

Application filed July 18, 1898. Serial No. 686,205. (No model.)

*To all whom it may concern:*

Be it known that I, CHARLES T. RICHMOND, a citizen of the United States, residing at Cleveland, in the county of Cuyahoga and State of Ohio, have invented a certain new and useful Improvement in Galvanic Batteries, of which the following is a full, clear, and exact description, reference being had to the accompanying drawings.

The invention relates to improvements in galvanic batteries of the Le Clanche type.

The battery embodying the invention is longer lived than the ordinary Le Clanche batteries, is neater in appearance, and it has the capacity of being refilled with the depolarizing material. The zinc element, the solution, and the depolarizer may have to be renewed; but except for these parts the battery may be used indefinitely.

The invention consists in the combination with a containing-jar, of a cover therefor preferably made of some insulating material, as porcelain, having a threaded boss on its under side and a hole through said boss and cover, a clay porous cup which screws onto said boss, the carbon element in said clay cup having a stem which extends up through the hole in the cover and carries a binding-post, the zinc element whose stem extends out through a hole in the cover, and a suitable depolarizer in said cup, and also in the subcombinations set forth in the claims.

In the drawings, Figure 1 is a sectional elevation of a cell embodying my invention. Fig. 2 is a horizontal sectional view on line 2 2 of Fig. 1, and Fig. 3 is a vertical sectional view of a modified construction.

Referring to the parts by letters, A represents a containing-jar, and B a cover therefor, which is preferably made of some insulating material, as porcelain. On the under side of this cover is a threaded boss $b$, and a hole $b'$ is formed through the cover and centrally through the boss. An internally-threaded clay porous cup C screws onto this boss and is supported thereby. In the porous cup is the carbon electrode D, surrounded by a suitable depolarizer, as manganese dioxid.

This carbon element has a stem $d$, which passes up through the hole $b'$ in the cover and boss and has any suitable binding-post F, or its equivalent, on its upper end. The shape of that part of the carbon element which is in the cup C is not material. It may be a fluted cylinder, as shown in Figs. 1 and 2, or it may be a hollow cylinder open at its lower end, as shown in Fig. 3, in which case the depolarizer would be inside the carbon element as well as outside of it in the clay porous cup, or the carbon element may be of any other shape presenting sufficient surface and having the stem $d$.

The zinc element E may be of the common form shown—viz., a curved plate $e$, having a stem $e'$, which passes out of the jar through a hole $b^2$ in the cover B.

It will be understood that the successful operation of the battery requires that the stem $d$ of the carbon element and the stem $e'$ of the zinc element shall be insulated from each other. This result may be effected by making the cover B of some insulating material, as described, this being the preferable and in my opinion best and most economical means for securing this result as well as the other advantages hereinbefore referred to.

Having described my invention, I claim—

1. In a galvanic battery, the combination of a jar, and a cover therefor made of insulating material, and having an integral threaded boss on its under side and a hole through said boss and cover, with a clay porous cup internally threaded at its open upper end, which cup is screwed onto said boss, a carbon electrode in said cup, having a stem which extends up through said hole, and a zinc electrode having a stem which projects through a hole in the cover, and is supported by said cover, and depolarizing material in said clay cup, substantially as specified.

2. In a galvanic battery, the combination of a jar-cover having a threaded boss on its under side and two holes, one passing through the boss and cover and one through the cover at one side of the boss, and a clay porous cup which is internally threaded at its open upper end and screwed onto said threaded boss, with the positive and negative elements, one contained in said porous cup and having its stem extended out through the hole in the boss and cover, and one outside of the porous cup having its stem extended through the other hole in the cover, the stems of said elements being insulated from each other, and a jar for containing said elements and adapted to be closed by said cover, substantially as specified.

In testimony whereof I hereunto affix my signature in the presence of two witnesses.

CHARLES T. RICHMOND.

Witnesses:
E. L. THURSTON,
CHAS. W. CHESNUTT.